Aug. 30, 1960 P. G. DUNMIRE 2,950,930
PIPE COUPLING HAVING FLUID RESPONSIVE SEALING MEANS
Filed July 5, 1957 6 Sheets-Sheet 1

INVENTOR.
PAUL G. DUNMIRE
BY
ATTORNEY

INVENTOR.
PAUL G. DUNMIRE
BY
ATTORNEY

Aug. 30, 1960 P. G. DUNMIRE 2,950,930
PIPE COUPLING HAVING FLUID RESPONSIVE SEALING MEANS
Filed July 5, 1957 6 Sheets-Sheet 3
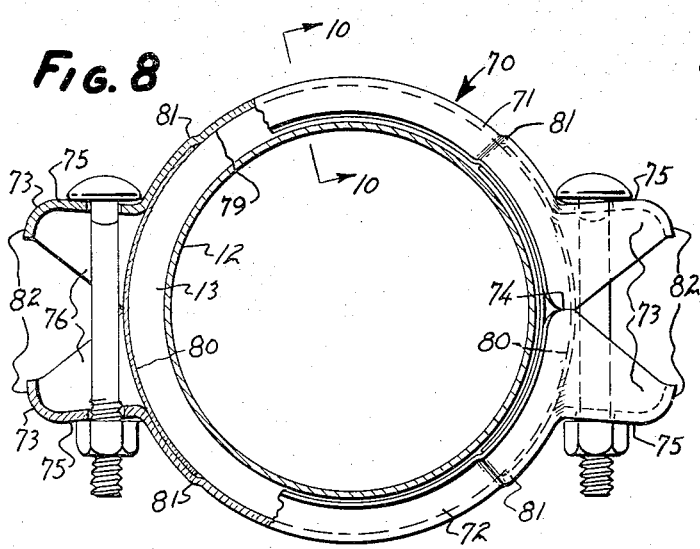
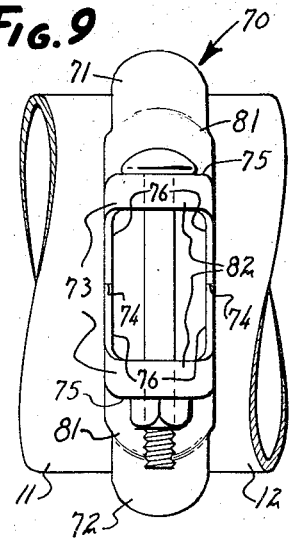
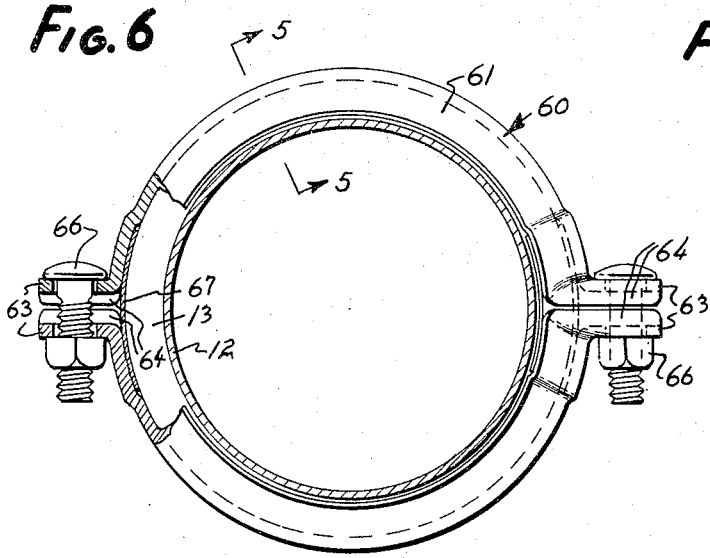
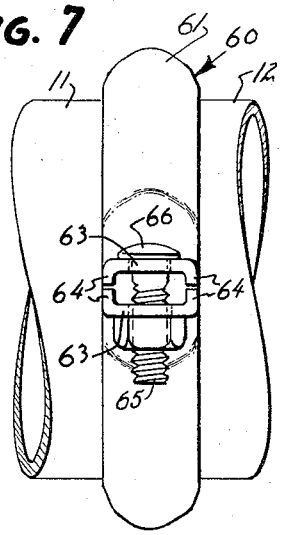
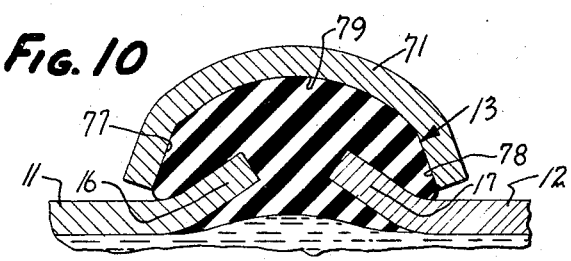
INVENTOR.
PAUL G. DUNMIRE
BY
ATTORNEY Aug. 30, 1960     P. G. DUNMIRE     2,950,930
PIPE COUPLING HAVING FLUID RESPONSIVE SEALING MEANS
Filed July 5, 1957     6 Sheets-Sheet 4
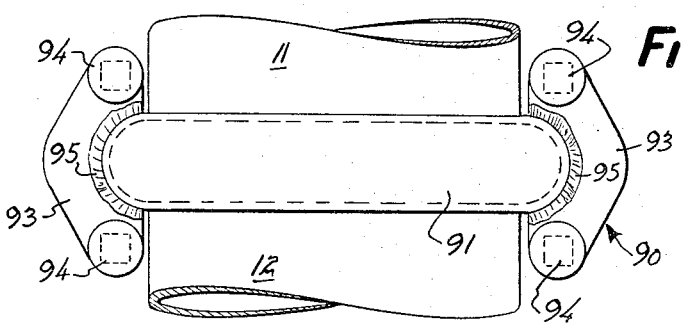
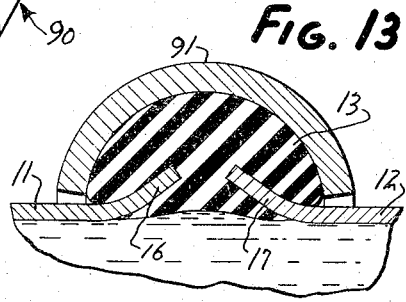
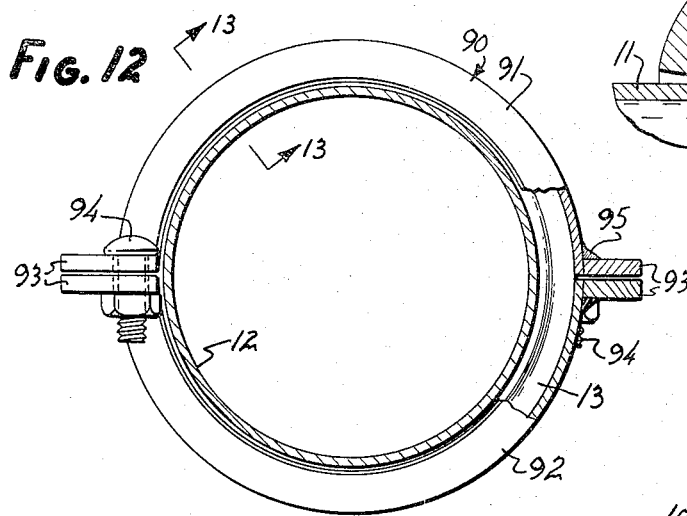
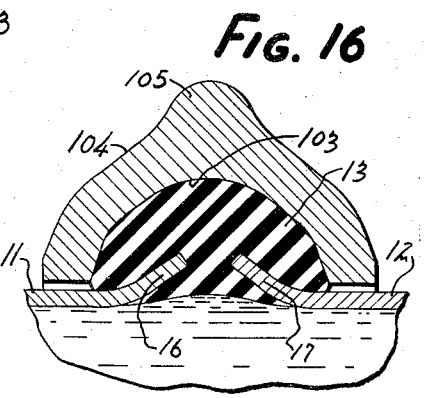
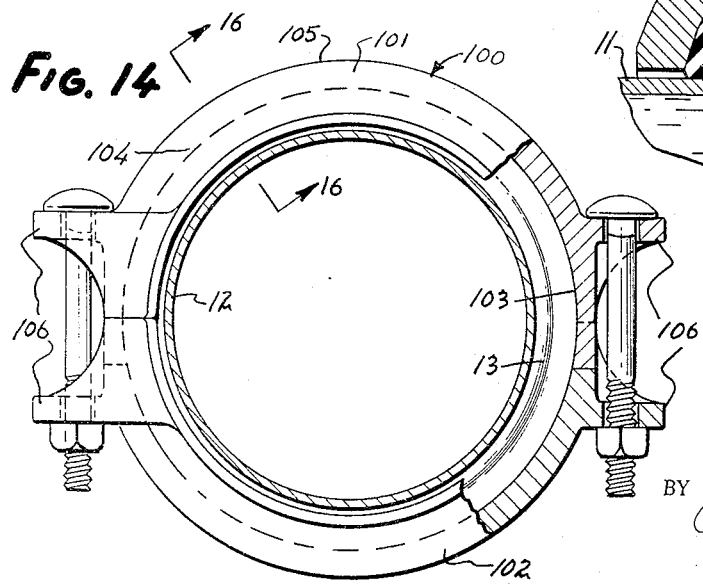
INVENTOR.
PAUL G. DUNMIRE
BY
ATTORNEY Aug. 30, 1960 P. G. DUNMIRE 2,950,930
PIPE COUPLING HAVING FLUID RESPONSIVE SEALING MEANS
Filed July 5, 1957 6 Sheets-Sheet 5
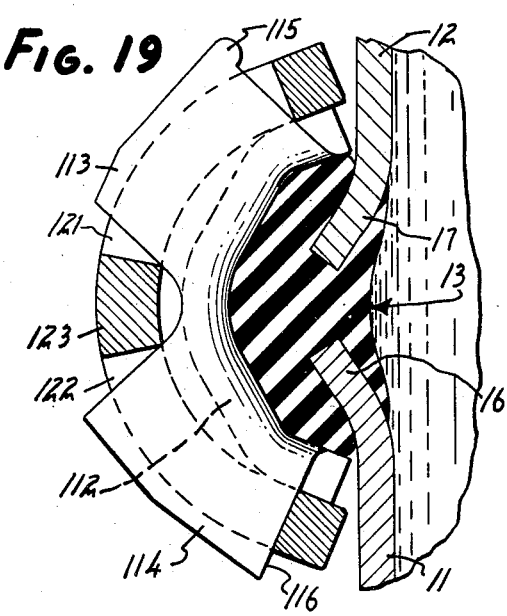
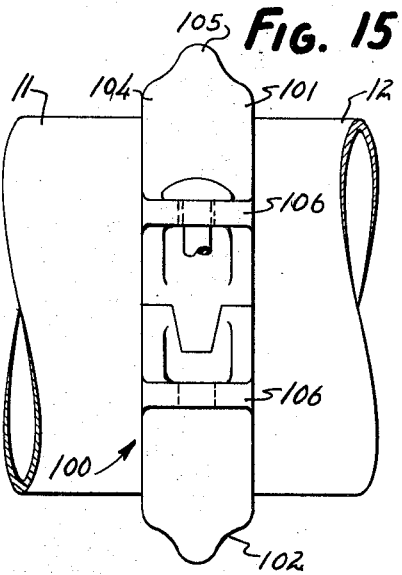
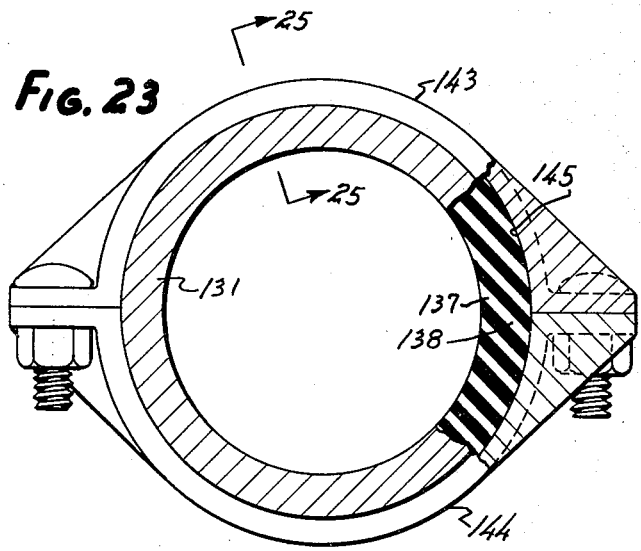
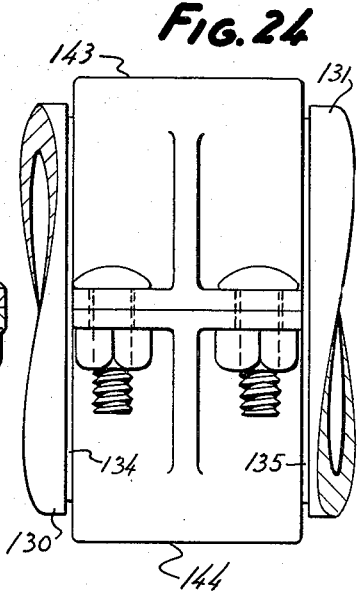
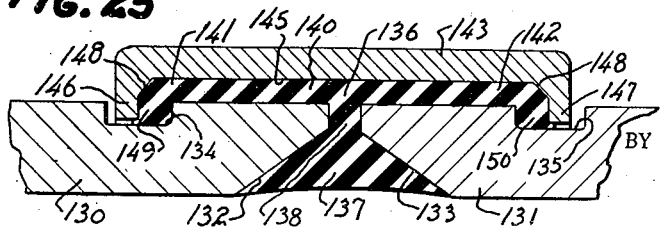
INVENTOR.
PAUL G. DUNMIRE
BY
ATTORNEY

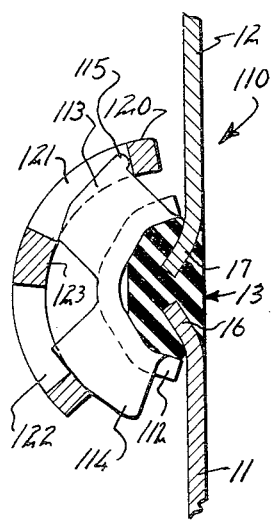
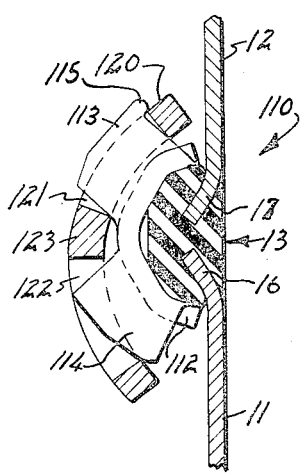
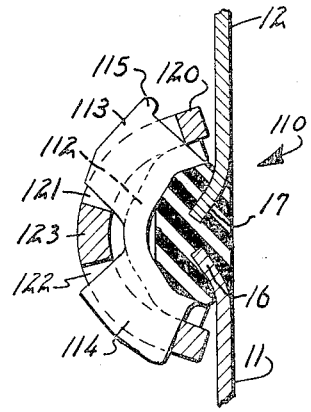
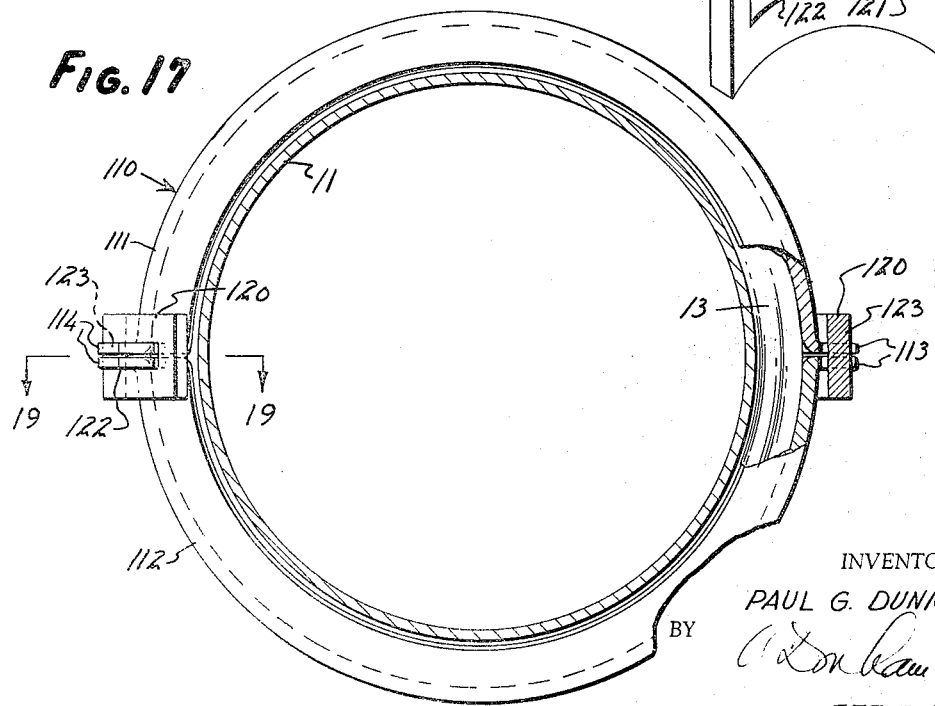

United States Patent Office 2,950,930
Patented Aug. 30, 1960

2,950,930

PIPE COUPLING HAVING FLUID RESPONSIVE SEALING MEANS

Paul G. Dunmire, Burlingame, Calif., assignor to Smith-Blair, Inc., South San Francisco, Calif., a corporation of California Filed July 5, 1957, Ser. No. 670,170

7 Claims. (Cl. 285—110)

This invention relates to an improved coupling for pipe, tubing, or conduit.

The invention provides an economical and rapidly applied coupling for joining pipe and the like, and it eliminates the necessity of end blocking. It can be used in portable installations where the pipe is simply laid on top of the ground, or it can be used in permanent installations, where the pipe is buried. Furthermore, pipe sections may be connected on top of the ground, and then the entire pipeline may be lowered progressively into the ditch.

Normal expansion and contraction of the line is accommodated by the complete encasement of the pipe ends in rubber, and pipe misalignment (angular deflection) is provided for by compressing the rubber which encases the pipe ends. Angularity is permissible up to about 5°, the exact amount depending on the pipe diameter.

In this novel coupling, the ends of the pipe or tubing are flared or (e.g., in cast pipe) provided with the equivalent of a flare. The flare normally extends back about ½" from the pipe end and acts, in combination with a novel coupler collar or clamp, to provide a lock that prevents the joined pipe from pulling out of the coupling. Preferably, the coupler collar is split for ease of installation, and when put together it draws a novel gasket down over the flare to provide the initial mechanical sealing. A feature of the coupling is that the natural tendency for pipe to "hydraulic" (or extend longitudinally when internal pressures are applied) acts advantageously, in that the application of pressure internally causes the flare to press the gasket tighter against the housing, providing a tighter seal.

The internal shape of the coupler collar is important in the effective sealing and utility of the unit. This shape will be explained in more detail below. For the present it should be noted that a tapered gasket cavity is provided between the outside of the flare and the inside of the clamp body. As pressure is applied, the gasket is wedged more and more tightly into this cavity, thereby raising the pressure-holding capabilities of the unit.

The internal lips of the novel gasket are so shaped that they are forced against the flared portion and coupler as pressure is applied by the hydraulic forces. Clearance is provided in the coupler collar or housing, over the center of the gasket, and the gasket is forced outward into this space by internal pressure; as a result the lips are forced into a restricted cavity and effect a tighter seal. This outward movement of the gasket also provides an unobstructed path through the inside of the pipe that reduces turbulence and cavitation. Solids in suspension may be transported in pipelines connected with these couplings, due to this continuity of the inner surface.

The novel gasket slips easily on to the pipe flare and does not have to be stretched on. This result is accomplished by a structure that includes an axially-extending top leg. When the coupler collar is applied, this top leg is folded down over the pipe flare and seals tightly with a positive mechanical force, eliminating the possibility of infiltration of outside material when a vacuum occurs in the pipeline.

The gasket also has a curved inner lip with a smaller radius than the flare of the pipe, assuring that the tip contacts the pipe and maintains pressure at all times.

Thus, one object of the invention is to provide a very easily installed flare-type coupling.

Another object of the invention is to provide a flare coupling that seals fluids tightly at both low and high pressures.

Another object is to provide a seal that prevents infiltration of outside material when there are vacuum conditions inside the pipeline.

Another object of the invention is to provide a flare-type coupling that permits angular deflection of the pipes relative to each other and to the gasket, without causing leaks.

Another object is to provide a coupling in which the gasket moves radially outwardly upon application of fluid pressure inside the pipe. In this coupling the gasket flows into space provided for this purpose and simultaneously wedges itself tightly between the band and the pipe wall so that an improved sealing action is produced.

Another object of the invention is to provide a coupling utilizing a split sleeve which can be installed and tightened without bolts or nuts. This object is achieved by providing the coupler sleeve halves with novel forms of tabs that can be locked together by a novel form of clip constructed according to the principles of this invention.

Other objects and advantages of the invention will appear from the following description of some preferred embodiments thereof.

Figure 1:
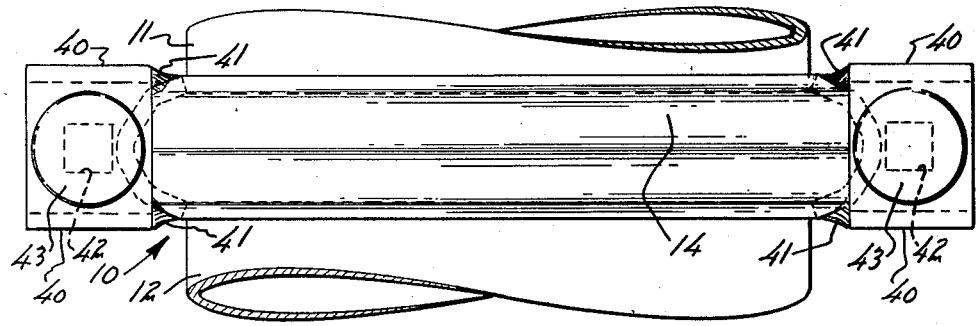
Fig. 1 is a top plan view of a coupling embodying the present invention shown installed to join two sections of pipe, the pipe ends being cut off to conserve space.
Figure 2:
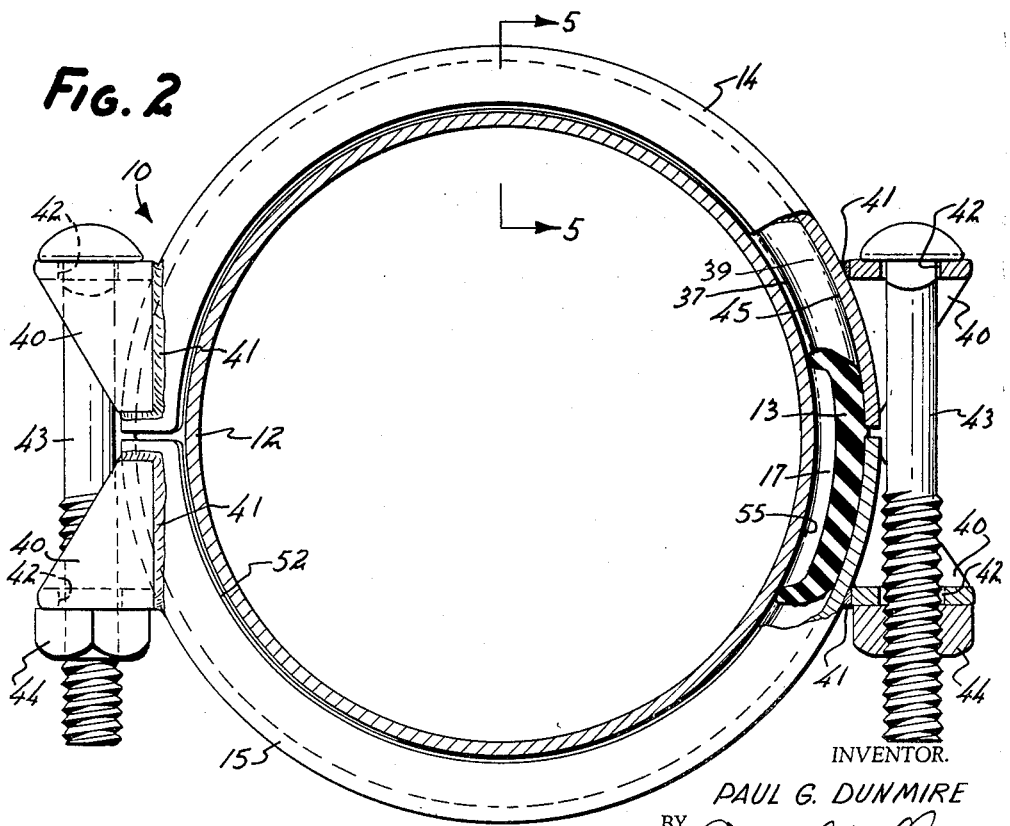
Fig. 2 is a view in end elevation of the coupling and pipe of Fig. 1. The pipe is shown in section, and a portion of the coupling at the right-hand side is broken away and shown in section.
Figure 3:
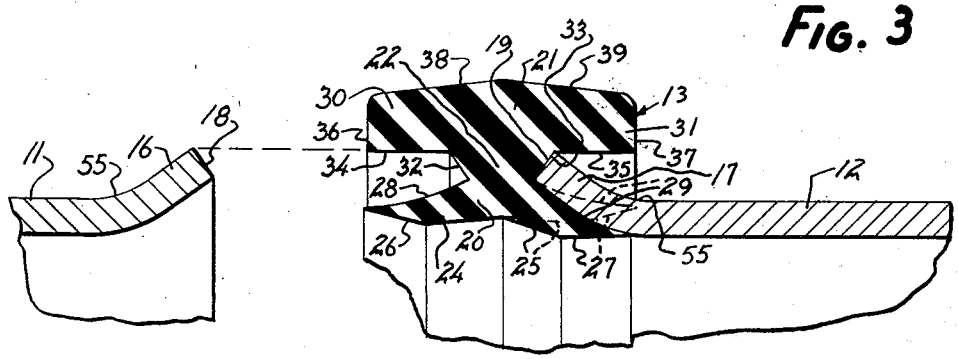

Fig. 3 is an enlarged view in elevation and in section of an upper portion of the gasket used in the coupling of Figs. 1 and 2 and shown partially installed. Both pipe sections have been broken to conserve space. The left-hand pipe section is shown before installation, and the right-hand pipe section is shown in its installed position. Broken lines show the position of the right-hand gasket lip before installation of the pipe.

Figure 4:
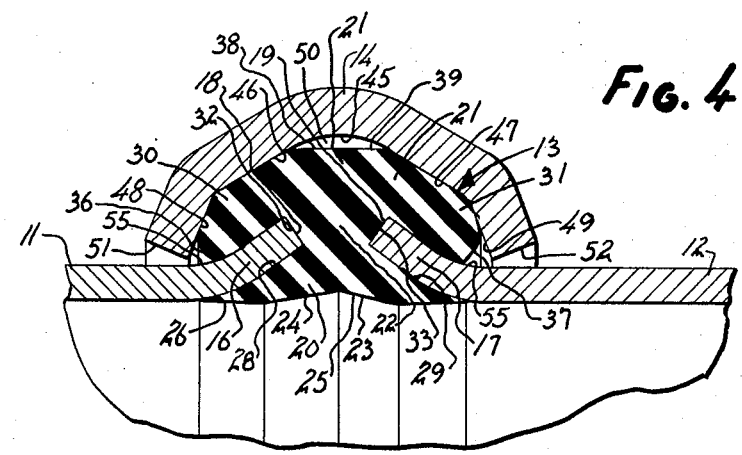

Fig. 4 is a view similar to Fig. 3 with the coupling collar in place, as it appears before internal pressure is applied.

Figure 5:
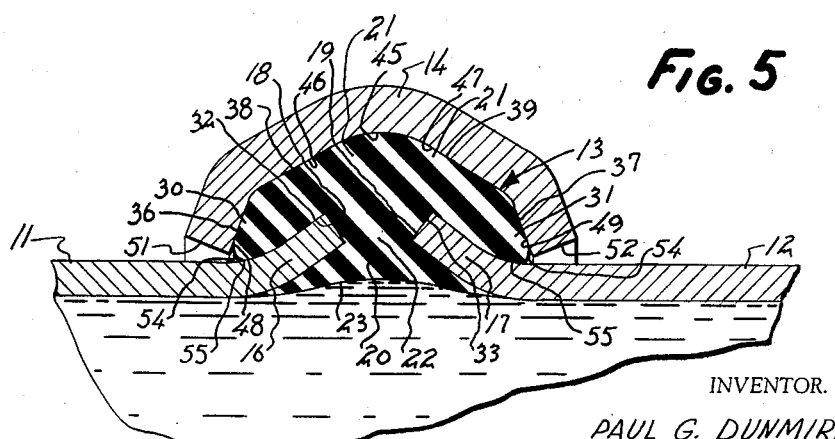

Fig. 5 is a view similar to Fig. 4 but showing the position assumed by the gasket upon application of substantial fluid pressure within the pipe. Fig. 5 may also be considered as taken along the line 5—5 in Figs. 2 and 6.

Fig. 6 is a view generally similar to Fig. 2 but on a reduced scale and showing a modified form of coupling collar. In this view the left-hand side is broken away and shown in section.

Fig. 7 is a view in side elevation of the coupling of Fig. 6, with the pipes broken off.

Fig. 8 is a view similar to Fig. 6 of another modified form of coupling using the same flared end and the same gasket but a different coupling collar.

Fig. 9 is a view in end elevation of the coupling of Fig. 8 with the pipes broken off.

Fig. 10 is an enlarged view in elevation and in section taken along the line 10—10 of Fig. 8.

Fig. 11 is a top plan view of another modified form of coupling shown installed to join two pipes, the pipes being broken off.

Fig. 12 is a view in end elevation of the coupling of Fig. 11 with the right-hand portion thereof broken away and shown in section.

Fig. 13 is an enlarged view in section taken along the line 13—13 of Fig. 12.

Fig. 14 is a view in end elevation of another modified form of coupling with the right-hand portion broken away and shown in section.

Fig. 15 is a view in side elevation of the coupling of Fig. 14.

Fig. 16 is an enlarged view taken along the line 16—16 of Fig. 14.

Fig. 17 is a view in end elevation of another modified form of coupling according to the present invention with the right-hand portion broken away and shown in section. This particular coupling does not employ bolts to hold it together but instead uses a novel form of clip.

Fig. 18 is an enlarged view in perspective of the clip used to fasten the coupling of Fig. 17.

Fig. 19 is an enlarged view in section taken along the line 19—19 in Fig. 17.

Fig. 20 is a view similar to Fig. 19 showing an initial position in the installation of the clip and tab linkage.

Fig. 21 is a view similar to Fig. 20 showing the next position in installation.

Fig. 22 is a view similar to Fig. 21 showing the final position of the clip and tabs.

Fig. 23 is a view in end elevation of another modified form of coupling embodying the present invention with the right-hand portion thereof shown in section.

Fig. 24 is a view in side elevation of the coupling of Fig. 23 with the pipes broken off.

Fig. 25 is an enlarged view in section taken along the line 25—25 in Fig. 23. It will be noted that in this instance a somewhat different form of gasket has been shown and that the pipe ends are not flared but are instead provided with annular recesses.

The coupling 10 shown in Figs. 1 and 2 joins two pipe sections 11 and 12 together and comprises an annular gasket 13 and a two-piece clamp or tightening band 14, 15 applied to flared pipe ends 16 and 17.

The flaring of the ends 16 and 17 (see Fig. 3) may be done in the factory or in the field during installation, by flaring tools which are well known and are obtainable on the market. Each flare 16, 17 is made relatively steep, preferably in the nature of about 30° to 35° of slope relative to the pipe wall. Tests indicate that in order to get the novel results of this invention the flare should be at least 30° and no more than 40°, and that the 30° to 35° construction usually gives the best results. The flared end portions 16 and 17 may be only about ½" long, though they may be somewhat greater or less than this, and they terminate in ends 18, 19. Except for these flared ends, the pipes 11 and 12 are generally smooth inside and out.

The gasket 13 employed in this invention is of novel configuration. Before the clamp is applied and as originally molded (see Fig. 3), the gasket 13 is generally of a T-shape having a radially inner portion 20 and a radially outer portion 21 connected by a neck portion 22. The generally axial inner periphery 23 of the inner portion 20 is preferably provided with two outwardly converging central faces 24 and 25, generally symmetrical and giving the periphery a generally concave center. Axially outer portions 26 and 27 of the periphery 23 diverge outwardly to a feather edge where they meet sloping faces 28 and 29 that are preferably concave as shown in Fig. 3 and lead into the neck 22.

The radially outer portion 21 of the gasket 13 provides a pair of top legs 30, 31 that, as originally molded and before installation, extend out axially on each side of the neck 22 beyond the neck's outwardly sloping faces 32, 33. The legs 30, 31 have originally axial lower faces 34, 35 preferably blunt radial ends 36, 37 and generally axial sloping, converging outer faces 38, 39.

The axially extending portions 30 and 31 not only assure the application of sealing pressure after the gasket 13 has been installed; they are also important during installation, because the flared ends 16, 17 can be slid against the neck 22 and faces 28 and 29 without interference from the gasket's outer portion 21. The initial abutment may thus be made as tight as may be convenient, while the gasket portion 21 will later be tightened into sealing position upon application of the clamps 14, 15 comprising the coupler collar. Fig. 3 shows the positions assumed before and after the flared ends 16 and 17 have been slid into the gasket 13.

The next step in installation (see Fig. 4) is to apply the clamp members 14, 15 around the gasket's outer axial face 38, 39. Several different forms for the clamps 14, 15 are feasible. Each clamp 14, 15 may be, as shown in Figs. 1–5, simply a semicircular single stainless steel band, formed to shape and provided with suitable lugs 40, as by welding them to the sleeve proper at 41. Each lug 40 has one or more bolt openings 42 therethrough to receive a bolt 43. When the clamp halves 14, 15 are placed around the gasket 13, the bolts 43 join them together, nuts 44 are added, and the clamp is tightened into the shape shown in Figs. 1 and 2, where it serves as the coupling collar, locking the flanged pipe ends 16, 17 in the gasket 13.

Preferably, the clamp's inner surface is shaped substantially as shown in Figs. 4 and 5 to provide a curved central portion 45 from which relatively flat sloping portions 46 and 47 lead to more sharply sloped end portions 48 and 49. When the clamp sections 14, 15 are made from pressed metal, the outside will be similarly shaped; when they are cast, the outside may be similar or different. The angularly extending frusto-conical side portions 46 and 47 define a channel between them, the bed of the channel being the curved portion 45. The frusto-conical sides 46, 47 are tapered at about the same or, preferably, slightly flatter angle as the pipe flares 16 and 17, while the end faces 48, 49 are sloped much more steeply, e.g., at about 60°. This provides a wedge-shaped cavity bounded by the ends 48, 49 and the flares 16, 17 into which portions of the gasket 13 are later driven by fluid pressure inside the pipe (Fig. 5).

Since the portion 21 is originally axial, there is no problem of trying to get an exact fitting of the pipe ends 18, 19 into the narrow gasket neck 22, as would be the case if the gasket 13 were formed into a shape resembling that which it finally assumes. But the pipe ends usually fit snugly against the neck 22 even before the clamps are applied. When installed, the clamps 14, 15 bend the projecting axial lower surfaces 34 and 35 of the gasket 13 down against the outer surface of the flared pipe portions 16 and 17.

When the nuts 44 are tightened and the clamps 14, 15 are fully applied, the outer gasket portion 21 is wedged between the flared portions 16, 17 and the clamp channel sides 46, 47, 48 and 49, the legs 30, 31 being bent over to partially fill the wedge-shaped cavity. However, the central portion of the outer axial rim near the convergence of the portions 38, 39 is still unflexed and is out of contact with the channel portion 45 of the clamps 14, 15 leaving a clearance 50 (Fig. 4), preferably about ⅛" on a 4" clamp. It will be noted that a close tolerance also obtains between the ends 51, 52 of the clamps 14, 15 and the wall of the pipes 11 and 12, the clearance preferably being about ¹⁄₃₂" at this point. The purpose of this is to lock the pipes 11 and 12 in securely and prevent them from pulling out of the clamps 14, 15.

Even though there is the clearance 50 between the gasket 13 and the clamps 14, 15, still there is adequate initial sealing pressure between the flared pipe ends 16, 17 and the radially inner gasket portion 20. Under low pressures the gasket 13 may remain substantially as shown in Fig. 4 and not be forced outwardly. Its faces 28 and 29 will not be forced away from the inner surface of the flared portions 16 and 17 by fluid flow because of the relatively steep angle of the flare. If the flare 16 or 17 were less than about 30°, there would be a strong tendency for water to seep in between the gasket 13 and the flared ends 16, 17 and to find its way outside, but with the present invention the angle is too steep for this to happen, and the continued increase of pressure will cause the gasket 13 to seal still more tightly.

Further increase in pressure will lead to the configuration shown in Fig. 5. The rubber gasket 13, being elastomeric, is not compressed, but the rubber flows outwardly so that the inner portion 20 assumes the shape shown with its inner periphery 23 concave. The outward pressure is substantial and considerable pressure is exerted by the faces 28, 29 on the flared ends 16, 17. At the same time, some of the rubber which is forced radially outwardly flows into the space 50 and fills this area, thereby sealing tightly against the clamp wall 45. The flow of the elastomer also wedges the portion 21 tightly between the clamps 14, 15 and the flared ends 16, 17. Continued flow under this pressure will actually force a little of the gasket ends 54, 55 to move out through the clearance space between the clamp ends 51, 52 and the pipes 11, 12. The wedging action causes a very tight seal against both the clamp 14 and the outer surface of the pipe walls and flared ends.

An important feature of the invention is that the ends 51, 52 of the clamp 14 do not contact the pipe wall. Since no reliance is made upon such contact, angular misalignment or deflection of the pipes 11, 12 relative to each other can take place up to about five or ten degrees without any adverse effect on the sealing action of the coupling 10. The gasket 13, in fact, acts as a cushion, allowing this deflection of the pipes 11, 12. The steep flare of the pipe ends 16, 17 also helps when there is deflection by preventing the ends from pulling out as would unflared ends or ends flared at too small an angle.

The gasket 13 in this invention acts as a live sealing member whose inner portion 20 lies substantially flush with the pipe wall at zero pressure but moves outwardly when pressure is applied. Both at low pressure and at high pressure the converging side walls 28, 29 seal tightly against the flared pipe end portions 16, 17, while at high pressure the wedged portions seal very tightly, as do the outer axial faces 48, 49 against the clamps 14, 15.

The angle of the flare is important and the presence of a radius portion 55 at the junction of the flare 16, 17 and the straight portion of the pipe 11, 12 is considered critical. Radial forces of considerable magnitude result from the two inclined planes moving outward as the pipe "hydraulics" along its longitudinal axis. The plane presented to the clamp materially affects the separating pressures on the bolts.

The modified form of coupling 60 shown in Figs. 6 and 7 is not greatly different from the coupling 10 shown in Figs. 1 through 5 and, in fact, the cross section through the clamps 61, 62 is exactly the same as that shown in Figs. 3–5. The principal difference is in the formation of lugs 63, as integral parts of the clamps 61, 62 while still forming the clamps 61, 62 from strip metal instead of from cast members. The two lugs 63 extend radially outwardly, each being given strength by forming them with flanges 64 on each side of a central portion 65 through which the bolt 66 extends. In this particular embodiment the lugs 63 lie closer together than do the lugs 40 so shorter bolts are used for this form of the invention, which is readily made from pressed steel. Protection may be given to the gasket 13 by a metal wear strip 67.

The modified form of coupler 70 shown in Figs. 8, 9 and 10 is similar type, also having stamped and formed pressed steel clamps 71, 72 with integral lugs 73 having a somewhat different configuration. The lugs 73 shown here have radially inner portions 74 that abut when the clamps 71, 72 are fully tightened, the portions 74 being joined to a central portion 75 by extended flanges 76. Here again is a part easily made from pressed steel and may be made to have the cross section shown in Fig. 3. However, in order to show another possible practical form, Fig. 10 is presented showing a clamp 71 with portions 77, 78 corresponding to the outer portions 48, 49 of the clamps 14 on either side of a wide smoothly curved inner portion 79. The effect is quite similar due to the angle of curvature, but consideration may lead to one or the other being preferable for any particular application.

The coupler 70 also has an armor strip 80 protecting the gasket 13 at the joints when the lugs 73 meet, with resultant change in shape of the clamps 71, 72 at 81. Also, the lugs 73 are further strengthened by an outer flange 82 formed on the pressed steel.

Figs. 11, 12, and 13 illustrate another modified form of coupling 90 again differing only in the structure of the clamps 91, 92. As shown in Fig. 13 the cross section of the pressed steel clamps 91, 92 is substantially semicylindrical. The previously described form is generally preferable but this one has the advantage of simplicity of manufacture. The clamps 91, 92 in this instance are provided with lugs 93 able to accommodate a plurality of bolts 94, the lugs being welded at 95 to the band ends. For applications where considerable pressure is needed, this use of double bolts is clearly advisable. Of course, the lugs 93 may be used with clamps having the cross section shown in Fig. 4 and vice versa.

Figs. 14, 15, and 16 show another modified form of coupler 100 with clamps 101, 102 made from cast material. As shown, the casting is heavier so that its outer surface 104 does not correspond to the inner surface 103, which in this instance is made substantially like that of the device shown in Figs. 1 to 5. The lugs are cast to be very similar to these shown in Figs. 1 to 5 except the casting has an outer rib 105 around the central portion where it is thickened. The lugs 106 are integral and are shown clearly in the drawings.

Another thing that can be achieved with this invention is the provision of a split clamp that can be joined together without bolts or nuts. A modified coupling 110 of the invention illustrating this construction is shown in Figs. 17 through 22. The flanged pipe ends 16, 17, the gasket 13, and the inner shape of the clamps are generally as shown in Figs. 3–5, but instead of providing the clamp with radially outwardly extending lugs with bolt openings through them, the end portions of each clamp half 111, 112 may be formed to provide a pair of radially outwardly extending tabs 113 and 114 as shown best in Fig. 19. These tabs 113 and 114 are preferably generally rectangular with a locking ear 115 on the tab 113 and with an outer edge 116 on the tab 114 that slopes inwardly as well as radially and may, for practical purposes, be considered undercut.

In combination with these tabs 113 and 114, I provide a clip 120 preferably having two openings 121 and 122 separated by a strengthening center member 123. (A single large opening may be satisfactory when strong material is used or where the load is relatively small.) When joining two clamp halves 111 and 112 together, there are a pair of tabs 113 and 114 at each end and those on the clamp half 111 are identical to those on the clamp half 112. The tabs 113 and 114 are held together as in Fig. 17, and the clip 120 is inserted over them, beginning, as shown in Fig. 20, by hooking the clip 120 over the ear 113, then bringing it around as shown in Fig. 21, and finally pushing it over the edge 116, which due to its slope prevents accidental withdrawal of the clip so that the clip 120 thus wedges itself in a position holding the clamp halves 111 and 112 tightly together.

Still another form of the invention may be used without flared pipe, and this is shown in Figs. 23, 24 and 25. Here pipe sections 130 and 131 are provided with machined ends having sloping end portions 132 and 133 on the inner surface of the pipes 130 and 131 and annular cavities or grooves 134 and 135 on the outer surface of each pipe away from the ends. A gasket 136 is used, preferably even more of a T-shape than the gasket 13, heretofore shown. Its inner portion 137 may be similar to the inner portion 20 of the gasket 13, or it may be slightly different without the tapering of the ends. Its neck portion 138 is preferably generally radial instead of having sloping portions that are more frusto-conical. But the chief difference in the gasket is in its outer axial portion 140 whose legs 141 and 142 extend out axially for a considerable distance and are relatively thin.

The clamps 143, 144 itself may be provided with lugs, bolts, or with tabs and clips. Its cross section may be that generally shown in Fig. 25, a channel 145 with depending lips 146 and 147. The major portion of the channel 145 is axial with the lips 146 and 147 extending substantially radially, though they may have a radius portion or sloping portion 148 connecting them to the axial portions of the channel 145. When applied, the clamps 143, 144 bend in outer ends 149 and 150 of the axial portions 141 and 142 gasket which, up to this time, extend axially, and force them into the grooves 134, 135. Tightening of the clamps 143, 144 forces the gasket 136 to assume the position shown in Fig. 25 with gasketing at the forward shoulder of each groove 134, 135 and at the outward part of the clamp. This type of coupling can be applied to pipe that does not have a flared wall but does have a sloping end wall 132, 133 that engages the gasket inner portions and does have the milled grooves 134, 135. It is most useful, therefore, for relatively heavy cast iron pipe or other type of pipe that can be machined.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A coupling for pipe, including in combination a pair of pipe sections having outwardly-flared ends with the slope of the flair being between 30° and 40° relative to the pipe wall; an annular gasket having a radially-inner, generally axially-extending portion with sloping radially-outer sides against which the inner surface of said flared ends abut and a generally concave radial inner side extending axially to meet the sloping outer sides at a knife-like edge to provide a gasket terminus which will be forced against the inner surface of the pipe by the current of fluid, and a thin generally radially-extending neck portion that connects said radially-inner portion to a radially-outer, axially-extending portion; and a pressure band means engaging said gasket and tightening around said pipe ends and having its inner surface provided with portions more sharply inclined to the horizontal than said flared ends and engaging said radially outer axially extending portion and turning it radially inwardly against said outwardly flared ends, said pressure band being separated by said gasket from said pipe sections to permit relative angular deflection between said sections.

2. The coupling of claim 1 wherein said band means comprises a split sleeve with each half having a pair of tabs projecting outwardly and adapted to abut a pair of tabs on the other half, and a clip member locking the pair of tabs on one sleeve to the pair of tabs on the other half.

3. The coupling of claim 1 wherein said band means comprises a split sleeve with lugs, bolts, and nuts.

4. The coupling of claim 1 wherein said band means comprises sheet metal sleeves bent to shape.

5. A coupling for pipe, including in combination a pair of pipe sections each provided with outwardly-flared ends with the slope of the flair being between 30° and 40° relative to the pipe wall; an annular gasket having a radially-inner, generally axially-extending portion with sloping radially-outer sides against which the inner surface of said flared ends abut and which end at a thin generally radially-extending neck portion that connects said radially-inner portion to a radially-outer, axially-extending portion; a generally concave radial inner side extending axially to meet the sloping outer sides at a knife-like edge to provide a gasket terminus which will be forced against the inner surface of the pipe by the current of fluid; and a pressure band having means for tightening it around said gasket and having its inner surface provided with sloping frusto-conical sides with a channel between them, said frusto-conical sides being more sharply inclined to the horizontal than said flared ends, whereby said flared ends abut said neck portion and said radially-outer portion is clamped between said band and the outer surface of said flared ends into a space wedge-shaped in cross-section, between said ends and said band there being at all times clearance between said band and said pipe sections and, there being, at low fluid pressures inside said pipe, a clearance between a central portion of said channel and said gasket, said clearance space being filled by said gasket at high pressures.

6. A coupling for pipe, including in combination a pair of pipe sections, each provided with ends flared outwardly at about 30°; an annular gasket, having a radially inner portion that is generally triangular in cross section with a generally axial inner knife-like periphery formed by the juncture of a generally concave radial axially extending inner side and radial axially extending outer sloping sides against which the inner surface of said flared ends abut and which end at a thin neck portion that joins said radially-inner portion to a radially-outer portion with an axially-extending portion on each side of said neck; and a pressure band having means for tightening it around said gasket and having its inner surface provided with sloping frusto-conical sides with a channel between them, said frusto-conical sides being inclined to the horizontal at about 35°, whereby said flared ends abut said neck portion and said radially-outer axially-extending portions are folded over the outer surface of said flared ends by said band and separate said pipe sections from said band so that the pressure on said gasket tightens it against said pipe sections.

7. A coupling for pipe, including in combination a pair of pipe sections whose ends are flared outwardly at between 30° and 40° to the horizontal; an annular gasket, having a radially-inner portion that is generally triangular in cross section with an axial inner periphery provided with two outwardly converging central faces generally symmetrical and giving the periphery a generally concave center and with axially outer portions diverging outwardly and sloping sides against which the inner surface of said flared ends abut and meeting said diverging axially outer portions at a feather edge, said sloping sides ending at a thin neck portion connecting said radially-inner portion to a radially-outer portion having axially-extending arm portions; and a pressure band having means for tightening it around said gasket and said pipe ends and having its inner surface provided with sloping frusto-conical sides with a channel between them, said frusto-conical sides being more sharply inclined to the horizontal than said flared ends, whereby said flared ends abut said neck portion and said arm portions are folded over the outer surfaces of said flared ends separating said pipe sections from said band so that said pipe sections can be angularly disaligned and so that said band acts to tighten said gasket against said pipe sections.

References Cited in the file of this patent

UNITED STATES PATENTS

| | | |
|---|---|---|
| 1,876,455 | Inshaw | Sept. 6, 1932 |
| 2,688,506 | Bakker | Sept. 7, 1954 |

FOREIGN PATENTS

| | | |
|---|---|---|
| 741,814 | France | Dec. 13, 1932 |
| 580,775 | Germany | July 15, 1933 |
| 550,990 | Great Britain | Feb. 3, 1943 |
| 507,903 | Belgium | June 18, 1952 |
| 681,662 | Great Britain | Oct. 29, 1952 |
| 310,593 | Switzerland | Jan. 14, 1956 |